United States Patent [19]
Mochizuki

[11] Patent Number: 5,347,368
[45] Date of Patent: Sep. 13, 1994

[54] IMAGE RECORDING APPARATUS HAVING A SMALL-CAPACITY FRAME MEMORY AND AN IMAGE RECORDING METHOD

[75] Inventor: Yasuyuki Mochizuki, Kanagawa, Japan

[73] Assignee: Fuji Photo Film Co., Ltd., Kanagawa, Japan

[21] Appl. No.: 827,756

[22] Filed: Jan. 29, 1992

[30] Foreign Application Priority Data

Jan. 31, 1991 [JP] Japan .................................. 3-10958

[51] Int. Cl.$^5$ .......................... H04N 1/21; H04N 1/387
[52] U.S. Cl. ..................................... 358/296; 358/404; 358/462; 395/115
[58] Field of Search .............. 358/296, 300, 302, 404, 358/443, 444, 448, 462; 395/115, 116

[56] References Cited

U.S. PATENT DOCUMENTS

| | | | |
|---|---|---|---|
| 4,999,629 | 3/1991 | Katsuta | 358/462 X |
| 5,072,291 | 12/1991 | Sekizawa | 358/462 X |
| 5,168,292 | 12/1992 | Kadowaki et al. | 395/116 X |
| 5,175,635 | 12/1992 | Yamada et al. | 358/462 X |

Primary Examiner—Benjamin R. Fuller
Assistant Examiner—Eric Frahm
Attorney, Agent, or Firm—Sughrue, Mion, Zinn, Macpeak & Seas

[57] ABSTRACT

A frame memory of an image recording apparatus includes a first frame memory for storing image data having a large number of pixels per unit area and a small number of gradations per pixel and a second frame memory for storing image data having a small number of pixels per unit area and a large number of gradations per pixel. Image data representing a character, a graphic figure or similar items requiring a high resolution is stored in the first frame memory, while image data inputted through a scanner or similar device and having a large number of gradations is stored in the second frame memory. In recording an image, the image data stored in the first frame memory is converted to image data having a large number of gradations, and the image data stored in the second frame memory is converted to image data having a high resolution, and recording is effected on the basis of these image data. As a result, images are recorded with high image quality by using a small-capacity frame memory.

18 Claims, 11 Drawing Sheets

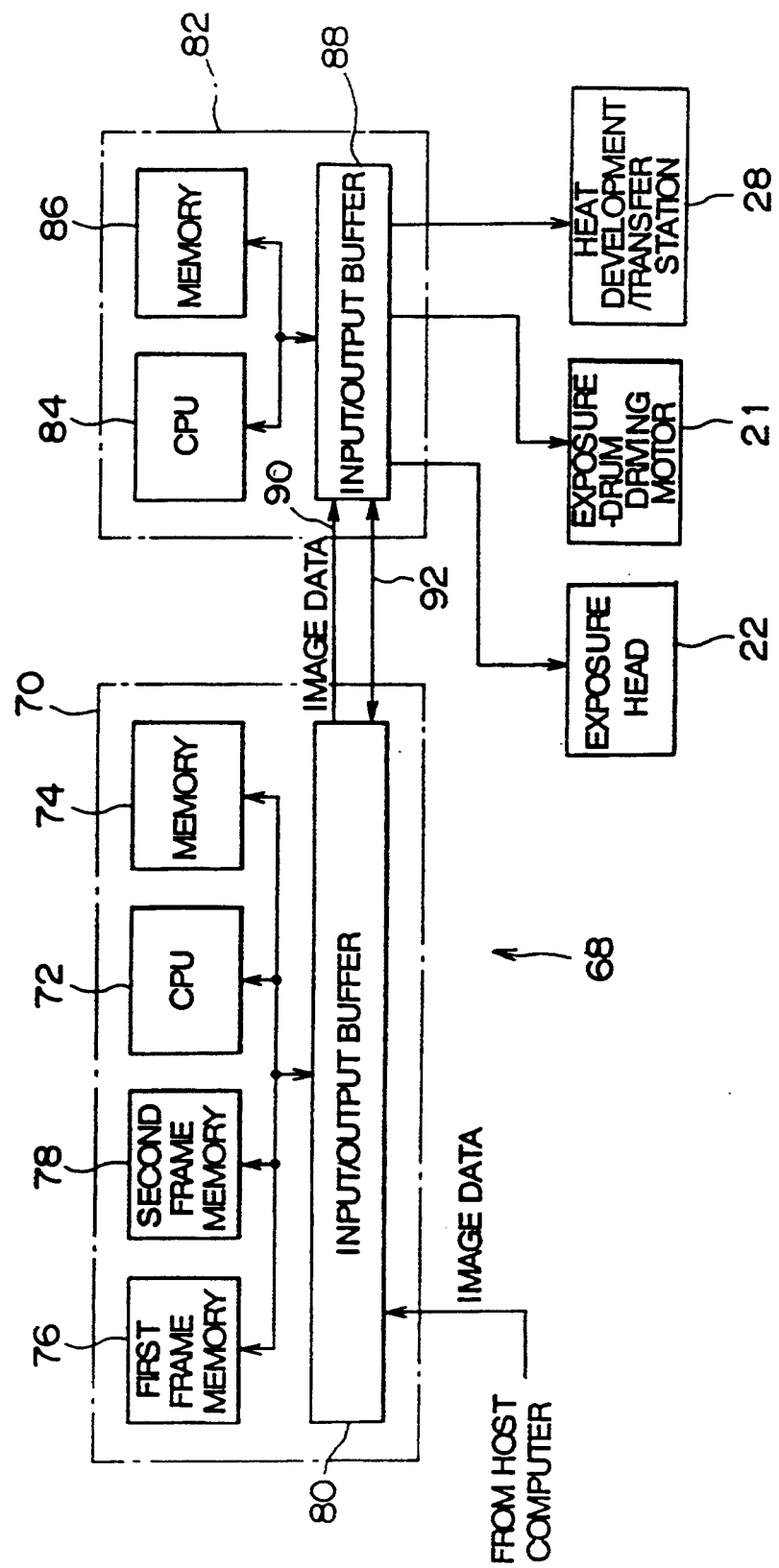

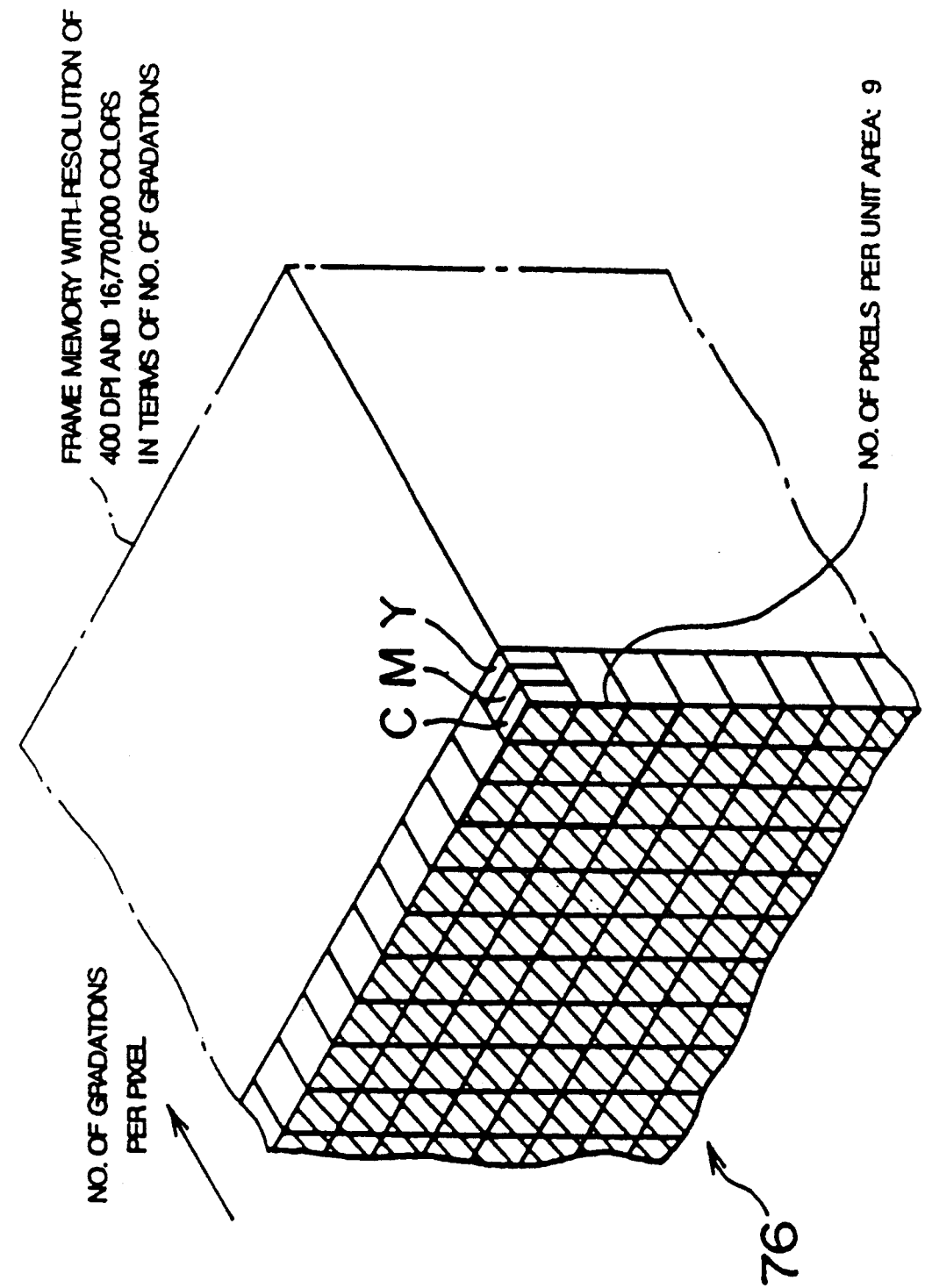

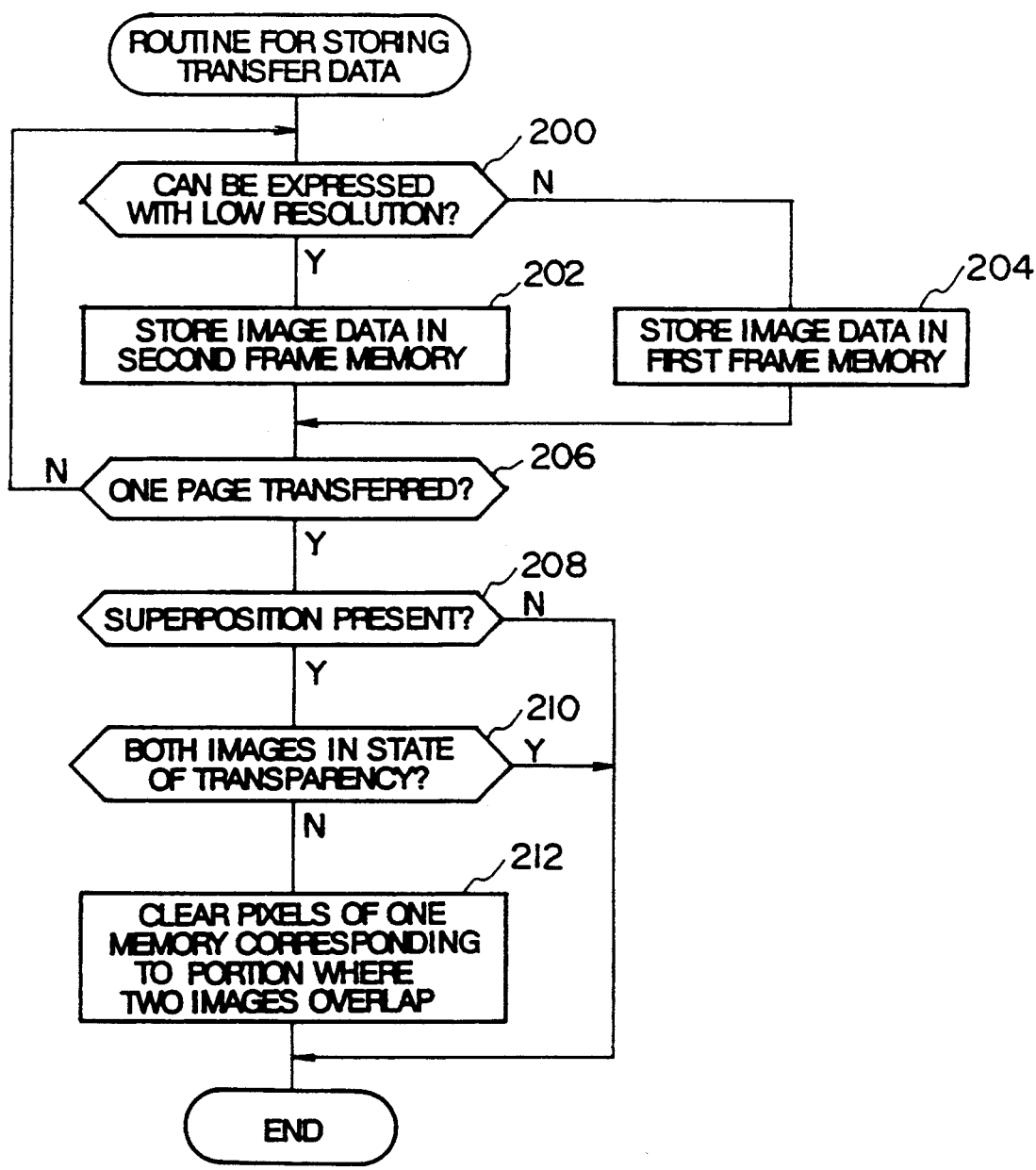

IMAGE RECORDING APPARATUS HAVING A SMALL-CAPACITY FRAME MEMORY AND AN IMAGE RECORDING METHOD

BACKGROUND OF THE INVENTION

1. Field of the Invention

The present invention relates to an image recording method and an image recording apparatus for recording images by using the image recording method.

2. Description of the Related Art

Image recording apparatus such as page printers are provided with a frame memory of a storage capacity capable of storing image data corresponding to a one-page portion, and record one page of an image at a time after temporarily storing in the frame memory image data inputted through a scanner or the like or image data transferred thereto from a host computer or the like. In recent years, there has been a demand for image recording apparatus such as page printers capable of recording high-quality images, and in the case of electrophotographic-type laser beam printers, for instance, printers capable of recording images with a high resolution of 400 dpi (dots per inch) or thereabouts are becoming a mainstay. In addition, there has been a growing demand for printers capable of recording color images and images having a large number of gradations (colors), and color page printers of a relatively small number of colors adopting a fusion-type heat transfer system have become available. Thus, there has been a demand for image recording apparatus capable of recording images with high image quality, i.e., with a high resolution and a large number of gradations.

However, in order to realize a page printer for recording images having a large number of gradations (colors) and a higher resolution, as in the case of silver halide photography or a sublimation-type heat transfer method, it is necessary to record images by using image data having a large number of gradations and a high resolution, so that the amount of image data becomes huge. As a result, it is necessary to mount on a printer body a large-capacity frame memory capable of storing the huge amount of image data, which entails the problem that the cost of the page printer becomes high. For instance, in order to store image data having full colors (16,770,000 colors) in terms of the number of gradations and a resolution of 400 dpi, the number of pixels required is 4583×3215 and the number of bits per pixel required is 24 (8 bits for cyan (C), magenta (M), and yellow (Y), respectively), so that a frame memory having a storage capacity of 44.2M bytes in total is required.

In addition, in a case where images are recorded by using image data transferred from a host computer, the host computer must also handle a huge amount of image data, so that a situation disadvantageously arises in that a major portion of the storage area of a storage device is occupied by the image data, or a high load is applied to the host computer to transfer the image data. With respect to binary image data such as characters and graphic figures, it is possible to overcome the above-mentioned problem by compressing the amount of data through compression processing by converting such binary image data to vector data. With respect to the raster data of a large number of gradations inputted through a scanner or the like, however, it is impossible to effectively compress the image data according to the present compression technique. In addition, it is also conceivable that a large load is applied to the host computer and the printer for compressing and restoring the image data.

SUMMARY OF THE INVENTION

Accordingly, it is a primary object of the present invention to provide an image recording method capable of reducing the capacity of a frame memory and of recording images with high image quality.

A second object of the present invention is to provide an image recording apparatus capable of reducing the capacity of a frame memory and of recording images with high image quality.

To attain the first object, in accordance with a first aspect of the invention, there is provided an image recording method comprising the steps of: if an image represented by image data can be expressed as an image having a small number of gradations per pixel, storing the image data in first storage means for storing image data having a large number of pixels per unit area and a small number of gradations per pixel, and if the image represented by the image data cannot be expressed as an image having a small number of gradations per pixel, storing the image data in second storage means for storing image data having a small number of pixels per unit area and a large number of gradations per pixel; converting the image data stored in the first storage means to image data having a large number of gradations per pixel, and converting the image data stored in the second storage means to image data having a large number of pixels per unit area; and recording an image on the basis of the converted image data.

In accordance with a second aspect of the invention, there is provided an image recording method comprising the steps of: if an image represented by image data can be expressed as an image having a small number of pixels per unit area, storing the image data in second storage means for storing image data having a small number of pixels per unit area and a large number of gradations per pixel, and if the image represented by the image data cannot be expressed as an image having a small number of pixels per unit area, storing the image data in first storage means for storing image data having a large number of pixels per unit area and a small number of gradations per pixel; converting the image data stored in the first storage means to image data having a large number of gradations per pixel, and converting the image data stored in the second storage means to image data having a large number of pixels per unit area; and recording an image on the basis of the converted image data.

In accordance with a third aspect of the invention, there is provided an image recording apparatus comprising: recording means for recording an image on the basis of image data having a large number of pixels per unit area and a large number of gradations per pixel; first storage means for storing image data having a large number of pixels per unit area and a small number of gradations per pixel; second storage means for storing image data having a small number of pixels per unit area and a large number of gradations per pixel; determining means for determining whether or not an image represented by the image data can be expressed as an image having a small number of gradations per pixel, an arrangement being provided such that if it is determined that the image represented by the image data can be so expressed, the image data is stored in the first storage means, while if it is determined that the image represented by the image data cannot be so expressed, the image data is stored in the second storage means; and converting means for converting the image data stored in the first storage means to image data having a large number of gradations per pixel, and converting the image data stored in the second storage means to image data having a large number of pixels per unit area, so as to supply the image data to the recording means.

In accordance with a fourth aspect of the invention, there is provided an image recording apparatus comprising: recording means for recording an image on the basis of image data having a large number of pixels per unit area and a large number of gradations per pixel; first storage means for storing image data having a large number of pixels per unit area and a small number of gradations per pixel; second storage means for storing image data having a small number of pixels per unit area and a large number of gradations per pixel; determining means for determining whether or not an image represented by the image data can be expressed as an image having a small number of pixels per unit area, an arrangement being provided such that if it is determined that the image represented by the image data can be so expressed, the image data is stored in the second storage means, while if it is determined that the image represented by the image data cannot be so expressed, the image data is stored in the first storage means; and converting means for converting the image data stored in the first storage means to image data having a large number of gradations per pixel, and converting the image data stored in the second storage means to image data having a large number of pixels per unit area, so as to supply the image data to the recording means.

The operation in accordance with the present invention will be described hereafter. It is preferred that images recorded by image recording apparatus be recorded with a high resolution and a large number of gradations. However, the present inventor focused his attention on the fact that most of various images to be recorded by image recording apparatus demand that they be recorded in such a manner as to satisfy either the high resolution or the large number of gradations. For instance, image data comprised of a character, a graphic figure, or the like which is required to be recorded with a high resolution is expressed by image data having a small number of gradations, i.e., by binary image data, and need not be recorded with a large number of gradations. In addition, an image which has been inputted through a color scanner or the like and is required to be recorded with a large number of gradations need not be recorded with a high resolution of 400 dpi, for example.

For this reason, in accordance with the first aspect of the invention, if an image represented by image data can be expressed as an image having a small number of gradations per pixel, the image data is stored in the first storage means, such as a frame memory, for storing image data having a large number of pixels per unit area and a small number of gradations per pixel. Meanwhile, if the image represented by the image data cannot be expressed as the image having a small number of gradations per pixel, the image data is stored in the second storage means for storing image data having a small number of pixels per unit area and a large number of gradations per pixel. As a result, the image data representing a character, a graphic figure, or the like is stored in the first storage means. Meanwhile, image data representing an image inputted through a color scanner or image data representing an image prepared through computer graphics is stored in the second storage means. The image data stored in the first storage means is converted to image data having a large number of gradations per pixel, while the image data stored in the second storage means is converted to image data having a large number of pixels per unit area, so as to be recorded as an image. Accordingly, since an image such as a character or a graphic figure is recorded with a high resolution, and an image inputted through a color scanner is recorded with a large number of gradations, it is possible to record images with high image quality without causing deterioration in the image quality required of the image to be recorded. In addition, since a large-capacity storage means such as a frame memory for storing image data with a high resolution and a large number of gradations is not required, the capacity of the storage means can be reduced.

In accordance with the second aspect of the invention, if an image represented by image data can be expressed as an image having a small number of pixels per unit area, the image data is stored in the second storage means for storing image data having a small number of pixels per unit area and a large number of gradations per pixel. Meanwhile, if the image represented by the image data cannot be expressed as the image having a small number of pixels per unit area, the image data is stored in the first storage means for storing image data having a large number of pixels per unit area and a small number of gradations per pixel. As a result, image data representing an image inputted through a color scanner or image data representing an image prepared through computer graphics is stored in the second storage means. Meanwhile, the image data representing a character, a graphic figure, or the like is stored in the first storage means. The image data stored in the first storage means is converted to image data having a large number of gradations per pixel, while the image data stored in the second storage means is converted to image data having a large number of pixels per unit area, so as to be recorded as an image. Accordingly, since an image such as a character or a graphic figure is recorded with a high resolution, and an image inputted through a color scanner is recorded with a large number of gradations, it is possible to record images with high image quality without causing deterioration in the image quality required of the image to be recorded. In addition, since a large-capacity storage means such as a frame memory for storing image data with a high resolution and a large number of gradations is not required, the capacity of the storage means can be reduced.

In a case where an image in which, for instance, a character portion to be recorded with a high resolution and a photograph portion to be recorded with a large number of gradations are mixed, is to be recorded using the image recording methods in accordance with the first and second aspects of the invention, recording can be effected by synthesizing two items of image data after image data representing the character portion is stored in the first storage means and image data representing the photograph portion is stored in the second storage means, and after converting the image data stored in the first storage means to image data having a large number of gradations per pixel and converting the image data stored in the second storage means to image data having a large number of pixels per unit area. In consequence, it is possible to obtain an image in which the character portion is expressed with a high resolution and the photograph portion is expressed with a large number of gradations.

In accordance with the third aspect of the invention, the storage means of the image recording apparatus is comprised of the first storage means for storing image data having a large number of pixels per unit area and a small number of gradations per pixel, and the second storage means for storing image data having a small number of pixels per unit area and a large number of gradations per pixel. For instance, in a case where a frame memory capable of storing image data having a resolution of 400 dpi and 8 colors (3 bits per pixel) in terms of the number of gradations, is used as the first storage means, and a frame memory capable of storing image data having a resolution of 133 dpi (number of pixels: 1528×1071) and 16,770,000 colors in terms of the number of gradations, is used as the second storage means, approximately 10.4M bytes is sufficient as the total storage capacity of the first and second storage means. This capacity accounts for 23.5% of 44.2M bytes which is the storage capacity of the aforementioned frame memory capable of storing image data having a resolution of 400 dpi and 16,770,000 colors in terms of the number of gradations. Hence, it can be appreciated that the storage capacity of the storage means can be reduced substantially.

In the third aspect of the invention, the determining means determines whether or not an image represented by the image data can be expressed as an image having a small number of gradations per pixel, the arrangement provided being such that if it is determined that the image represented by the image data can be so expressed, the image data is stored in the first storage means, while if it is determined that the image represented by the image data cannot be so expressed, the image data is stored in the second storage means. As a result, YES is given as the answer in this determination with respect to image data representing a character, a Graphic figure, or the like, and such image data is stored in the first storage means as the image data having a large number of pixels per unit area and a high resolution. Meanwhile, NO is given as the answer in that determination with respect to image data representing an image inputted through a color scanner or an image prepared by computer Graphics, and such image data is stored in the second storage means as the image data having a large number of gradations per pixel. The image data stored in the first storage means is converted by the converting means to image data having a large number of gradations per pixel, and the image data stored in the second storage means is converted by the converting means to image data having a large number of pixels per unit area, so as to allow an image to be recorded by the recording means. For this reason, since an image such as a character or a graphic figure is recorded with a high resolution, and an image inputted through a color scanner is recorded with a large number of gradations, it is possible to record images with high image quality without causing deterioration in the image quality required of the image to be recorded.

In accordance with the fourth aspect of the invention, in a manner similar to that of the third aspect of the invention, the storage means of the image recording apparatus is comprised of the first storage means for storing image data having a large number of pixels per unit area and a small number of gradations per pixel, and the second storage means for storing image data having a small number of pixels per unit area and a large number of gradations per pixel. For this reason, as described before, it is possible to reduce the capacity of the storage means as compared with a case where a frame memory for storing image data having a large number of pixels per unit area and a large number of gradations per pixel is provided.

In addition, the determining means determines whether or not an image represented by the image data can be expressed as an image having a small number of pixels per unit area, the arrangement provided being such that if it is determined that the image represented by the image data can be so expressed, the image data is stored in the second storage means, while if it is determined that the image represented by the image data cannot be so expressed, the image data is stored in the first storage means. As a result, YES is given as the answer in this determination with respect to image data representing an image inputted through the color scanner or an image prepared by computer graphics, and such image data is stored in the second storage means. Meanwhile, NO is given as the answer in that determination with respect to image data representing a character, a graphic figure, or the like, and such image data is stored in the first storage means. The image data stored in the first storage means is converted by the converting means to image data having a large number of gradations per pixel, while the image data stored in the second storage means is converted by the converting means to image data having a large number of pixels per unit area, so as to allow an image to be recorded by the recording means. For this reason, in the same way as in the third aspect of the invention, since an image such as a character or a graphic figure is recorded with a high resolution, and an image inputted through a color scanner is recorded with a large number of gradations, it is possible to record images with high image quality without causing deterioration in the image quality required of the image to be recorded.

In a case where an image in which, for instance, a character portion to be recorded with a high resolution and a photograph portion to be recorded with a large number of gradations are mixed is to be recorded using the image recording apparatus in accordance with the third and fourth aspects of the invention, recording can be effected by synthesizing two items of image data after image data representing the character portion is stored in the first storage means and image data representing the photograph portion is stored in the second storage means, and after converting the image data stored in the first storage means to image data having a large number of gradations per pixel by the converting means and converting the image data stored in the second storage means to image data having a large number of pixels per unit area by the converting means. In consequence, it is possible to obtain an image in which the character portion is expressed with a high resolution and the photograph portion is expressed with a large number of gradations.

As described above, in accordance with the first aspect of the invention, the arrangement provided is such that if an image represented by image data can be expressed as an image having a small number of gradations per pixel, the image data is stored in the first storage means, such as a frame memory, for storing image data having a large number of pixels per unit area and a small number of gradations per pixel, while if it cannot be so expressed, the image data is stored in the second storage means for storing image data having a small number of pixels per unit area and a large number of gradations per pixel, so as to record the image. Accordingly, it is possible to obtain outstanding advantages in that the capacity of the storage means can be reduced and images can be recorded with high image quality.

In accordance with the second aspect of the invention, the arrangement provided is such that if an image represented by image data can be expressed as an image having a small number of pixels per unit area, the image data is stored in the second storage means for storing image data having a small number of pixels per unit area and a large number of gradations per pixel, while if it cannot be so expressed, the image data is stored in the first storage means for storing image data having a large number of pixels per unit area and a small number of gradations per pixel, so as to record the image. Accordingly, it is possible to obtain outstanding advantages in that the capacity of the storage means can be reduced and images can be recorded with high image quality.

In accordance with the third aspect of the invention, the arrangement provided is such that the storage means of the image recording apparatus is comprised of the first storage means for storing image data having a large number of pixels per unit area and a small number of gradations per pixel, and the second storage means for storing image data having a small number of pixels per unit area and a large number of gradations per pixel. In addition, a determination is made as to whether or not an image represented by the image data can be expressed as an image having a small number of gradations per pixel, so as to store the image data in either of the two storage means. Accordingly, it is possible to obtain outstanding advantages in that the capacity of the storage means can be reduced and images can be recorded with high image quality.

In accordance with the fourth aspect of the invention, the storage means of the image recording apparatus is comprised of the first storage means for storing image data having a large number of pixels per unit area and a small number of gradations per pixel, and the second storage means for storing image data having a small number of pixels per unit area and a large number of gradations per pixel. In addition, a determination is made as to whether or not an image represented by the image data can be expressed as an image having a small number of pixels per unit area, so as to store the image data in either of the two storage means. Accordingly, it is possible to obtain outstanding advantages in that the capacity of the storage means can be reduced and images can be recorded with high image quality.

BRIEF DESCRIPTION OF THE DRAWINGS

FIG. 2 is a schematic diagram of a control unit of the image recording apparatus and peripheral portions of the control unit;

FIG. 3A is a perspective diagram illustrating a configuration of a first frame memory;

FIG. 10 is a flowchart illustrating another example of transfer-data storage processing.

DESCRIPTION OF THE PREFERRED EMBODIMENT

Figure 1:
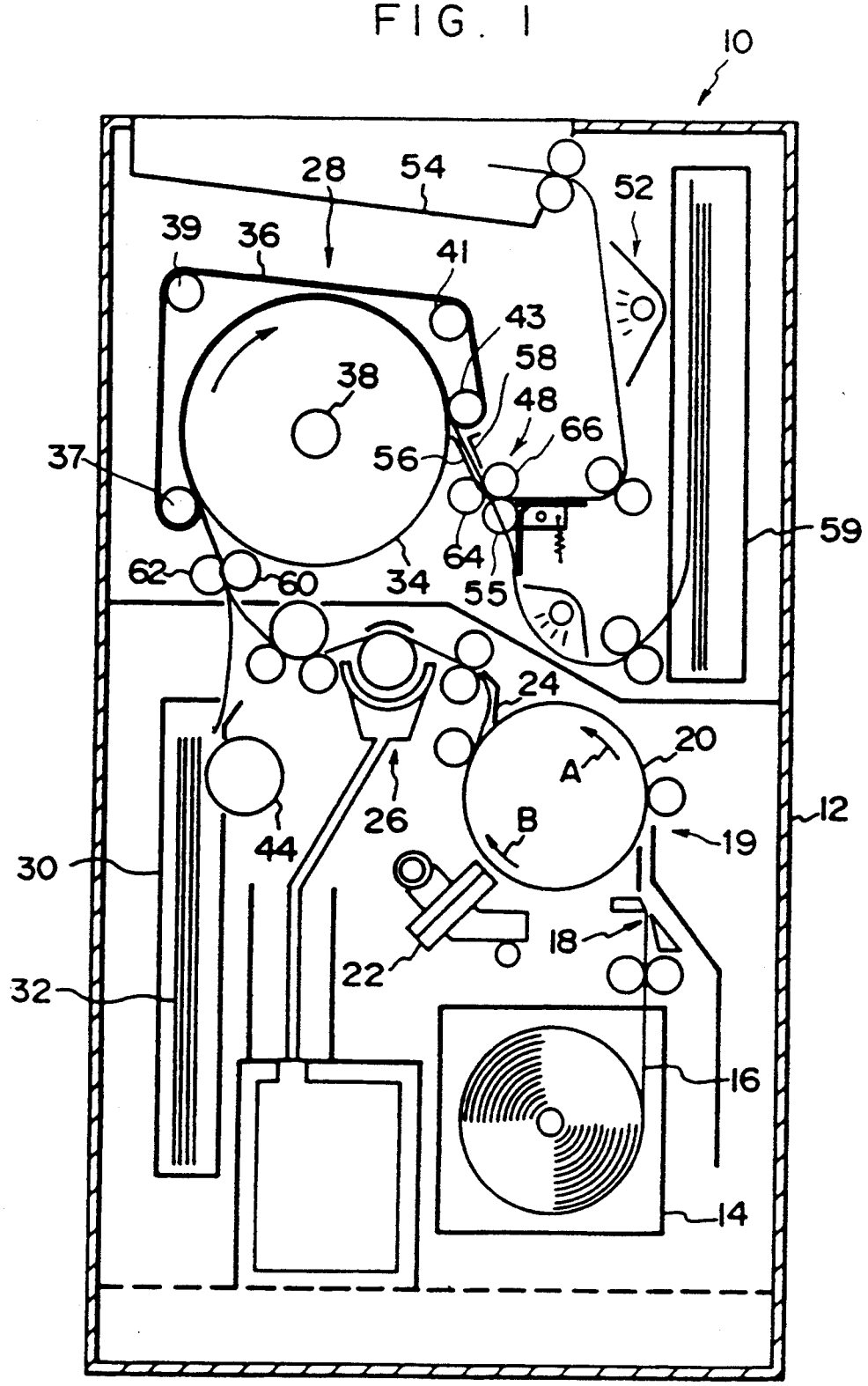
FIG. 1 is a schematic diagram of an image recording apparatus in accordance with an embodiment of the present invention.

Referring now to the accompanying drawings, a detailed description will be given of the embodiment of the present invention. It should be noted that although a description will be given hereafter by using preferable numerical values, the present invention is not restricted to the numerical values given in this embodiment. FIG. 1 illustrates an image recording apparatus 10 in accordance with the embodiment. A magazine 14 is accommodated within a machine frame 12 of the image recording apparatus 10, and a heat-developable photosensitive material 16 in the form of a roll is accommodated in the magazine 14. After a leading portion of the heat-developable photosensitive material 16 is paid out of the magazine 14, the heat-developable photosensitive material 16 is cut to a predetermined length by a cutter 18, and is then transported to an exposure station 19. An exposure drum 20 is provided in the exposure station 19. The exposure drum 20 rotates as the driving force of an exposure-drum driving motor 21 (see FIG. 2) is transmitted thereto. The heat-developable photosensitive material 16 transported to the exposure station 19 is wound around the outer periphery of the exposure drum 20 in the direction of arrow A in FIG. 1.

An exposure head 22 is disposed in the vicinity of the outer periphery of the exposure drum 20 in correspondence with the peripheral surface of the exposure drum 20. The exposure head 22 has unillustrated LEDs for emitting light corresponding to cyan (C), magenta (M), and yellow (Y). Image data is supplied from a slave processor 82 (see FIG. 2) of a control unit 68, which will be described later, to the exposure head 22, and the LEDs are caused to emit light in correspondence with the image data supplied in a state in which the exposure drum 20 with the heat-developable photosensitive material 16 wound therearound, is rotating at high speed, thereby allowing the heat-developable photosensitive material 16 to be exposed imagewise. Specifically, the exposure head 22 records an image on the heat-developable photosensitive material 16 by forming pixels with a recording density of 400 dpi thereon through exposure. The LEDs corresponding to C, M, and Y express gradations of 16,770,000 colors per pixel in response to the image data supplied thereto. Accordingly, this exposure head 22 is capable of recording images in which the number of pixels per unit area is large and the number of gradations per pixel is large, i.e., images having a high resolution and a large number of gradations.

The imagewise exposed heat-developable photosensitive material 16 is peeled off the exposure drum 20 by a scraper 24 as the exposure drum 20 is rotated reversely (in the direction of arrow B in FIG. 1). Subsequently, water serving as an image-forming solvent is applied to the heat-developable photosensitive material 16 in a water-applying station 26, and the heat-developable photosensitive material 16 is then transported into a heat development/transfer station 28. A tray 30 is disposed below the heat development/transfer station 28, and a plurality of sheets of image-receiving material 32 tried to a predetermined length are accommodated in the tray 30. This image-receiving material 32 is consecutively taken out one sheet at a time by a supply roller 44 disposed at a side portion of the tray 30, and is transported into the heat development/transfer station 28.

A heating drum 34 and an endless pressure-contact belt 36 are disposed in the heat development/transfer station 28. A halogen lamp 38 is disposed in the heating drum 34, and the outer periphery of the heating drum 34 is heated by the halogen lamp 38. The endless pressure-contact belt 36 is wound around tension rollers 37, 39, 41, and 43, and its outer side in the endless state is brought into pressure contact with the outer periphery of the heating drum 34. A pair of superposition rollers 60 and 62 are disposed in the vicinity of the tension roller 37 around which the endless pressure-contact belt 36 is wound. The heat-developable photosensitive material 16 transported into the heat development/transfer station 28 and the image-receiving material 32 are superposed one above the other by the superposition rollers 60 and 62, and are fed into a nip between the heating drum 34 and the endless pressure contact belt 36. When the heat-developable photosensitive material 16 is heated in the heat development/transfer station 28 in a state in which it is superposed on the image-receiving material 32, the heat-developable photosensitive material 16 undergoes heat development. Concurrently, an image is transferred to the image-receiving material 32, thereby allowing the image to be formed on the image-receiving material 32.

A release station 48 is disposed in the vicinity of the tension roller 43 around which the endless pressure-contact belt 36 is wound. Drive rollers 64 and 66 are disposed in the release station 48. In addition, a pair of guide plates 56 and 58 are disposed between the tension roller 43 and the drive rollers 64 and 66. The guide plates 56 and 58 guide the heat-developable photosensitive material 16 and the image-receiving material 32, fed out of the nip between the the endless pressure-contact belt 36 and the heating drum 34, into a nip between the drive rollers 64 and 66. In addition, a pair of free rollers 55 are provided in such a manner as to abut against the outer peripheral surface of the drive roller 66 at axial ends thereof, respectively. The transverse dimension of the image-receiving material 32 is set to be greater than that of the heat-developable photosensitive material 16, and the heat-developable photosensitive material 16 and the image-receiving material 32 which have passed between the drive rollers 64 and 66 are separated from each other as the transverse ends of the image-receiving material 32 are held by the drive roller 66 and the free rollers 55.

The separated heat-developable photosensitive material 16 is transported and is accommodated in a waste-photosensitive-material accommodating box 59. The image-receiving material 32 is dried by a drier 52, and is then sent up to a takeout tray 54 formed on the top of the machine frame 12.

As shown in FIG. 2, the control unit 55 includes a master processor 70 and a slave processor 82. The master processor 70 is arranged such that a CPU 72, a memory 74, a first frame memory 76, a second frame memory 58, and an input/output buffer 80 are connected to each other via a bus. The first frame memory 76 is capable of storing image data having a resolution of 400 dpi (4583×3215 pixels) and 8 colors in terms of the number of gradations. That is, the first frame memory stores image data of a high resolution and a small number of gradations. Meanwhile, the second frame memory 78 is capable of storing image data having a resolution of 133 dpi (1528×1071 pixels) and 16,770,000 colors in terms of the number of gradations. That is, the second frame memory 78 stores image data of a low resolution and a large number of gradations.

Figure 3B:
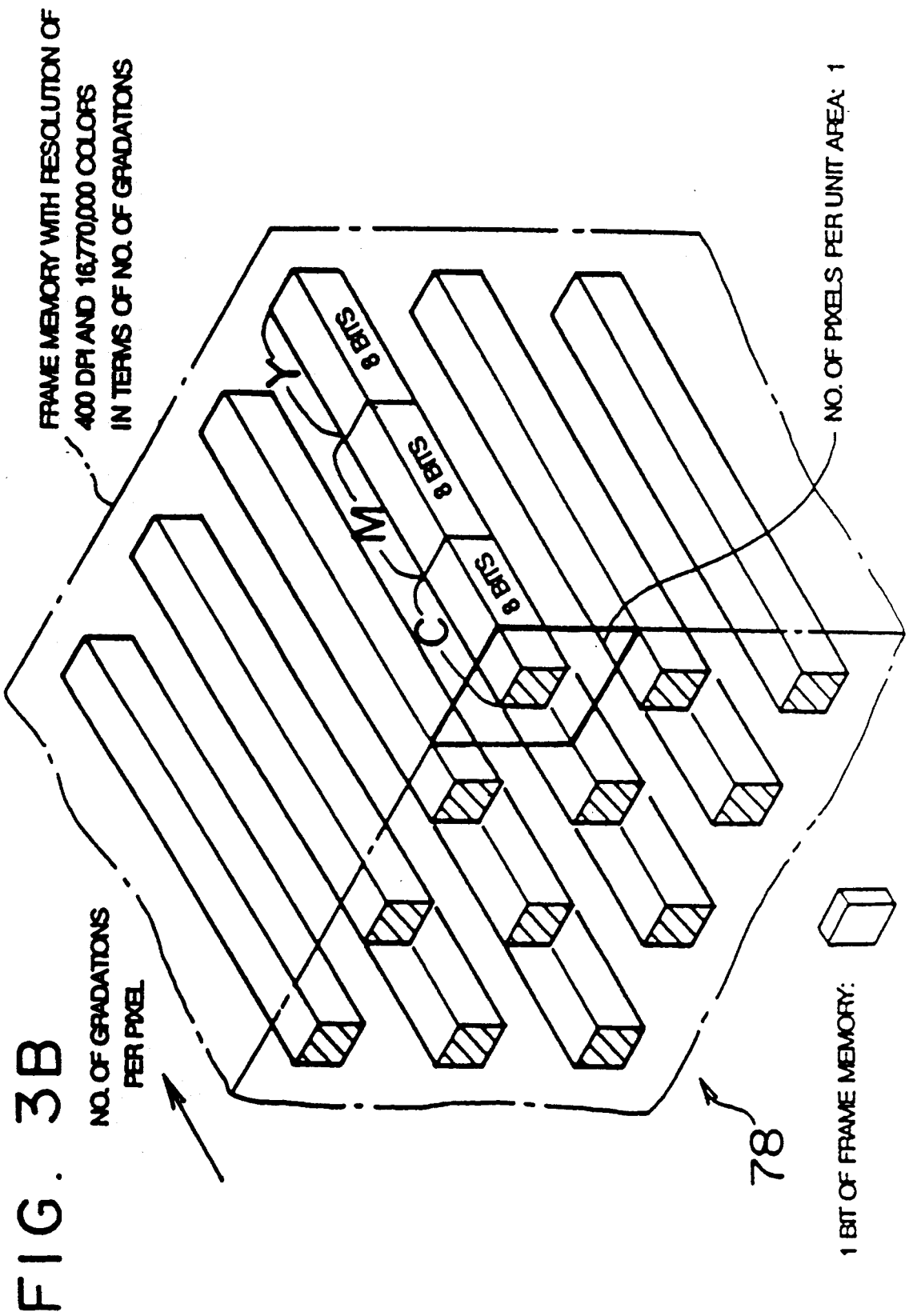
FIG. 3B is a perspective diagram illustrating a configuration of a second frame memory.

A more detailed description will be given of the first and second frame memories 56 and 78 with reference to FIGS. 3A and 3B. In comparison with the second frame memory 78, the first frame memory 76 is capable of storing image data having a greater number of (9-fold) pixels per unit area. In addition, the storage capacity per pixel of the first frame memory 76 is 3 bits in total with 1 bit allotted to each of C, M, and Y, while the storage capacity per pixel of the second frame memory 78 is 24 bits in total with 8 bits allotted to each of C, M, and Y. Here, the total of the storage capacities of the first and second frame memories 76 and 78 is 10.4M bytes. This figure accounts for 23.5% of 44.2M bytes, which is the storage capacity of a frame memory (shown by a phantom line in FIG. 3) capable of storing image data having a resolution of 400 dpi and 16,770,000 colors in terms of the number of gradations. Hence, the capacity of the frame memory is reduced substantially. An unillustrated host computer is connected to the input/output buffer 80, and image data is transferred thereto from the host computer. The transferred image data is stored in either the first frame memory 76 or the second frame memory 78. It should be noted that the data format of the image data transferred from the host computer to the master processor 70 is not fixed, and data formats of image data transferred between the same includes those of raster data and vector data representing a character, a graphic figure, or the like and having a resolution of 400 dpi and 16,770,000 colors in terms of the number of gradations, for example.

Meanwhile, the slave processor 82 is arranged in such a manner that a CPU 84, a memory 86, and an input/output buffer 88 are connected to each other via a bus. The input/output buffer 80 of the master processor 70 and the input/output buffer 88 of the slave processor 82 are connected to each other via an image data bus 90 and a data bus 92. The image data stored in the first and second frame memories 76 and 78 are transferred to the slave processor 82 via the image data bus 90, and are supplied to the exposure head 22 connected to the input/output buffer 88 as described above. In addition, serial communication is effected between the master processor 70 and the slave processor 82 via the data bus 92.

In addition to the aforementioned exposure head 22, the exposure-drum driving motor 21 and the heat development/transfer station 28 are connected to the input/output buffer 88 of the slave processor 82. The slave processor 82 controls the operation of the exposure-drum driving motor 21 so that the exposure drum 20 will rotate in synchronism with the imagewise exposure of the heat-developable photosensitive material 16. Also, the slave processor 82 controls the operation of a transport system in the heat development/transfer station 28, the halogen lamp 38, and the like so that the image on the exposed heat-developable photosensitive material 16 will be developed and will be transferred to the image-receiving material.

Figure 4:
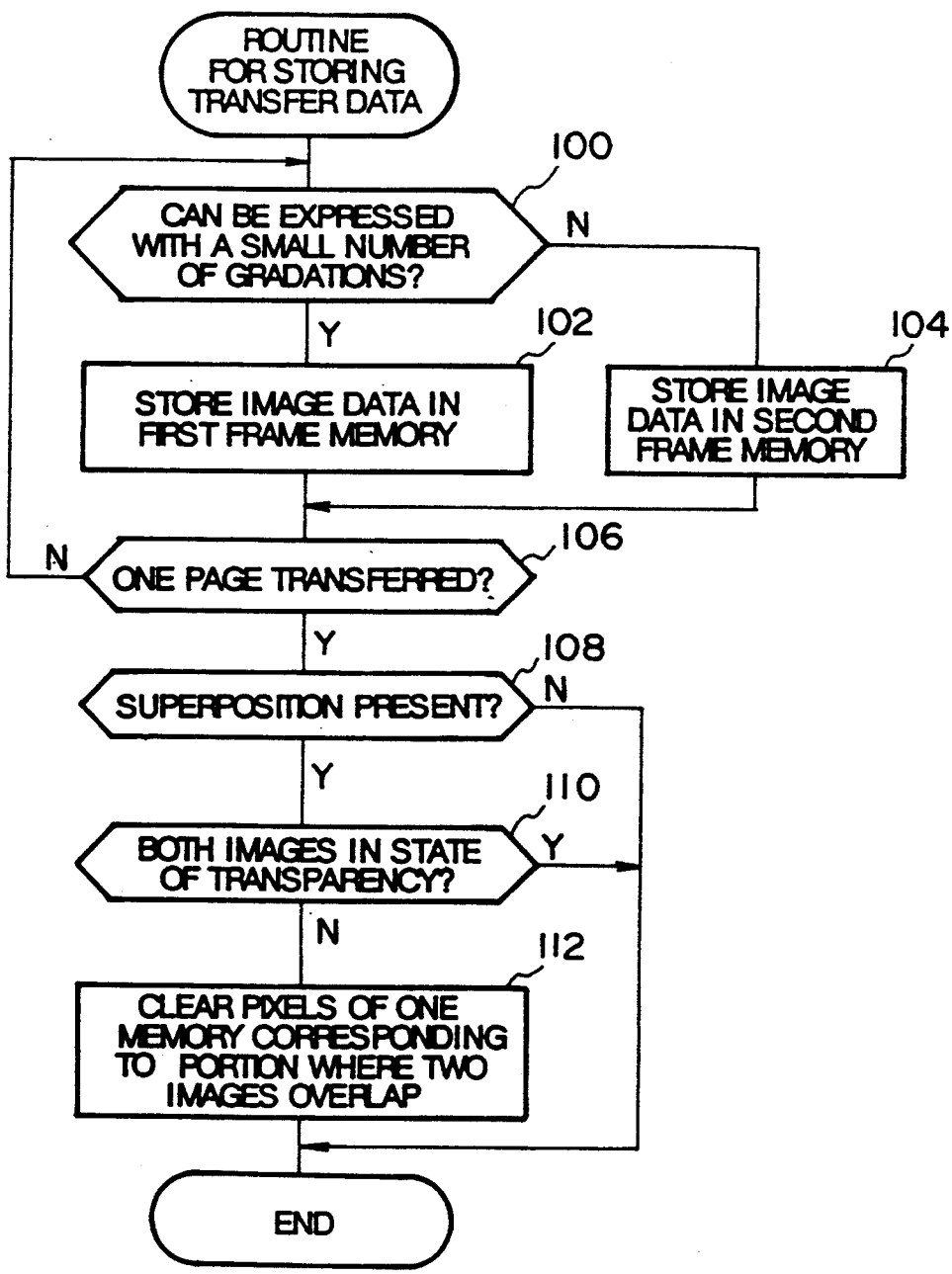
FIG. 4 is a flowchart explaining a routine for transfer-data storage processing.

The operation of this embodiment will be described hereafter. First, with reference to a flowchart shown in FIG. 4, a description will be given of processing for storing image data transferred from the host computer. The flowchart shown in FIG. 4 is executed upon reception of an instruction on transfer of image data from the host computer.

In Step 100, a determination is made as to whether or not the image represented by the image data received can be expressed as an image having a small number of gradations per pixel. This determination can be made on the basis of various matters. For instance, this determination can be made by determining the type of image data on the basis of the instruction on transfer of image data received. That is, in a case where in terms of the data format the image data is vector data representing a character, a graphic figure, or the like and composed of line segments, coordinates of pixels at opposite ends of each of the line segments are included in that image data. With respect to such image data representing a character, a graphic figure, or the like, the image quality does not deteriorate even if the image data is expressed as an image having a small number of gradations, so that YES is given as the answer in the aforementioned determination. On the other hand, in a case where in terms of the data format the image data is raster data and half-tone pixels are included among the gradations, the image quality deteriorates if the image data is expressed as an image having a small number of gradations. In such a case, NO is given as the answer in the aforementioned determination. Accordingly, NO is given as the answer in the aforementioned determination in the case of transfer of image data representing an image inputted through a color scanner or image data representing an image prepared by computer graphics.

If YES is the answer in the determination in Step 100, in Step 102, the transferred image data is stored in the first frame memory 76 after converting its data format to that of the first frame memory 76. As for this conversion, in a case where in terms of the data format the transferred image data is, for example, vector data representing a character, a graphic figure, or the like composed of line segments, gradation values are given to all the pixels composing the line segment in the first frame memory 76, and the vector data is converted to raster data having the data format of the first frame memory 76. On the other hand, in a case where in terms of the data format the transferred image data is, for example, raster data having a high resolution and a large number of gradations, conversion is effected in such a manner as to compress the number of gradations per pixel to 8 colors (3 bits). Since the first frame memory 76 is capable of storing image data having a large number of pixels per unit area, the first frame memory 76 is capable of storing image data representing a character, a graphic figure, or the like without deteriorating the resolution.

On the other hand, if NO is the answer in the determination in Step 100, in Step 104, the transferred image data is stored in the second frame memory 78 after converting its data format to that of the second frame memory 78. As for this conversion, in a case where in terms of the data format the transferred image data is, for example, raster data having a high resolution and a large number of gradations, conversion is effected by selecting the pixels in such a way that the resolution becomes 133 dpi, and the gradation values of the selected pixels are stored in the second frame memory 78. Since the second frame memory 78 is capable of storing image data having a large number of gradations per pixel, the second frame memory 78 is capable of storing image data representing an image inputted through a color scanner or image data representing an image prepared by computer graphics without deteriorating the number of gradations and colors.

In Step 106, a determination is made as to whether or not the transfer of a one-page portion of image data has been completed. For instance, if the image on one page to be recorded by the image recording apparatus 10 is an image which is composed of only a character or a graphic figure and does not include a half tone or the like in the background or an image which is composed of only a picture or photograph and does not include a character, a graphic figure, or the like, then YES is given as the answer in this determination and the operation proceeds to Step 108. However, if, for example, both a character and a photograph are included in the image in one page, or a half tone has been designated as the gradation of an area enclosed by a graphic figure, then NO is given as the answer in the aforementioned determination, and the operation returns to Step 100 to repeat Steps 100 to 104.

In Step 108, a determination is made as to whether or not the image data stored in the first frame memory 76 and the image data stored in the second frame memory 78 are to be superposed one above the other at the time of recording the one-page portion of the image. If, as described above, the image on one page to be recorded is an image which is composed of only a character or a graphic figure and does not include a half tone or the like in the background or an image which is composed of only a picture or photograph and does not include a character, a graphic figure, or the like, then YES is given as the answer in this determination and the operation proceeds to Step 110.

In Step 110, a determination is made as to whether or not the image data stored in the first frame memory 76 and the image data stored in the second frame memory 78 are in a state of transparency. For example, in a case where a high-density (e.g., black) line is included in an image and a midway portion of that line passes through a low-density (e.g., white) area, and if that passing portion of the line is visible through that area, the line and that area are in the state of transparency. In such a case, YES is given as the answer in the aforementioned determination, and processing ends. However, in a case where the aforementioned passing line is not visible, the high-density line and the low-density area are in a relationship in which the former is overwritten by the latter. Also, in cases where a character is depicted over a photograph portion as in an advertisement, and the photograph portion behind a line of that character is not visible, the photograph portion and the character are in a relationship in which the former is overwritten by the latter. In such a case, NO is given as the answer in Step 110, and the operation proceeds to Step 112.

In Step 112, with respect to the portion where the image data stored in the first frame memory 76 and the image data stored in the second frame memory 78 overlap, data on pixels stored in one frame memory and corresponding to the overlapped portion to be overwritten, is cleared (set to 0). For instance, in a case where the image data representing a high-density line included in the image is stored in the first frame memory 76, and the image data representing a low-density area having a portion located midway in the line is stored in the second frame memory 78, the data on pixels stored in the first frame memory 76 and corresponding to the portion of the line where the low-density area overlaps is cleared. As a result, if the image data stored in the first frame memory 76 and the image data stored in the second frame memory 78 are synthesized, as will be described later, as for the portion of the image where the line and the low-density area overlap, that portion is expressed in such a manner that the line is overwritten by the low-density area.

In this manner, the image data transferred from the host computer is stored in the first and second frame memories 76 and 78.

Figure 5:
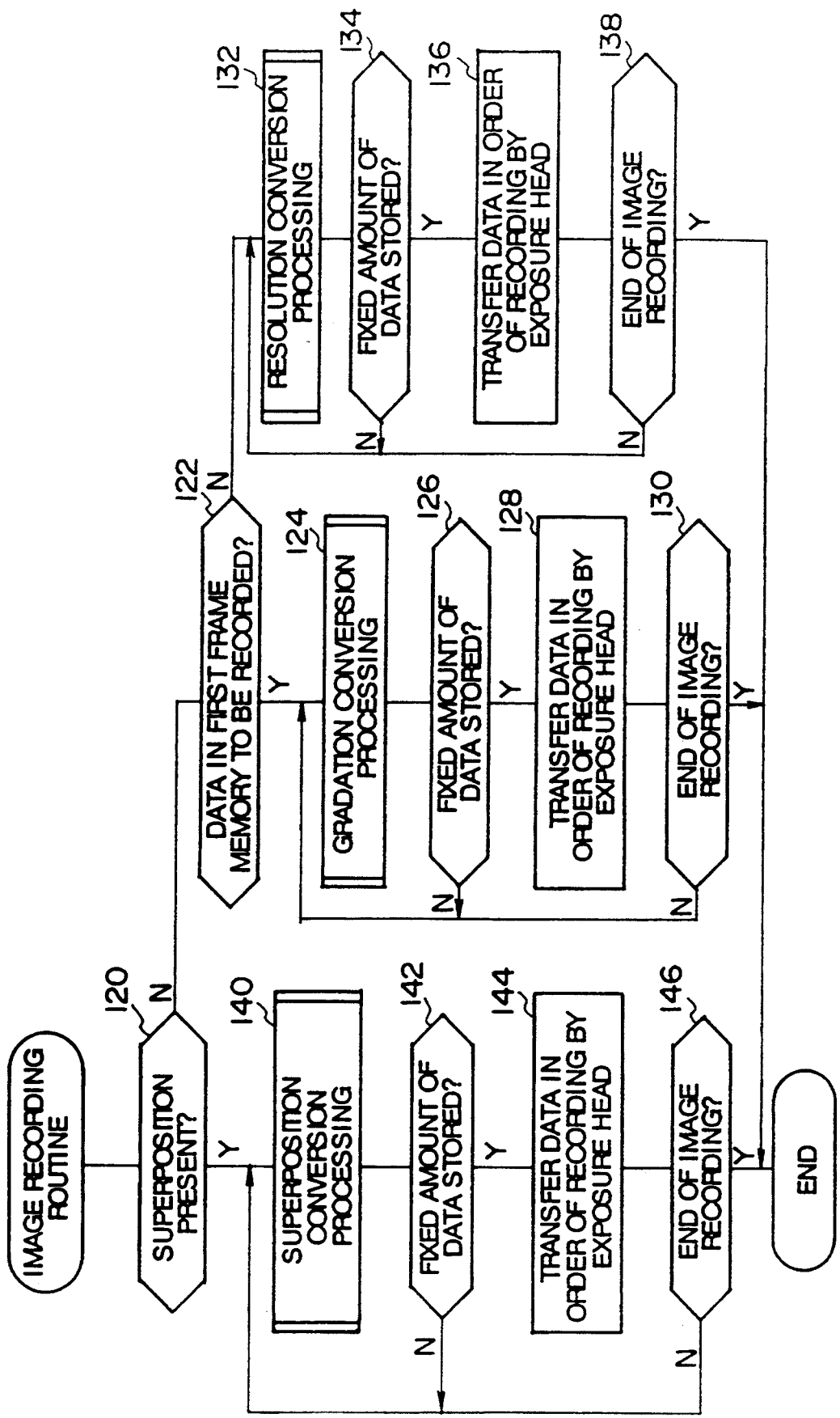
FIG. 5 is a flowchart illustrating a routine for image recording processing.

Referring now to a flowchart shown in FIG. 5, a description will be given of processing for recording an image by transferring the image data stored in the second frame memory 78 to the slave processor 82. The flowchart shown in FIG. 5 is executed when it is confirmed that, after the heat-developable photosensitive material 16 paid out of the magazine 14 has been cut by the cutter 18, the heat-developable photosensitive material 16 is wound around the outer periphery of the exposure drum 20, and that the slave processor 82 is in a ready state capable of effecting processing.

In Step 120, a determination is made as to whether or not the image is to be recorded by superposing the image data stored in the first frame memory 76 and the image data stored in the second frame memory 78 one above the other. If NO is the answer in the determination in Step 120, the operation proceeds to Step 122 to determine whether or not the image is to be recorded by using only the data stored in the first frame memory 76. For instance, YES is given as the answer in this determination with respect to the image on one page which is composed of only a character or a graphic figure.

Figure 6:
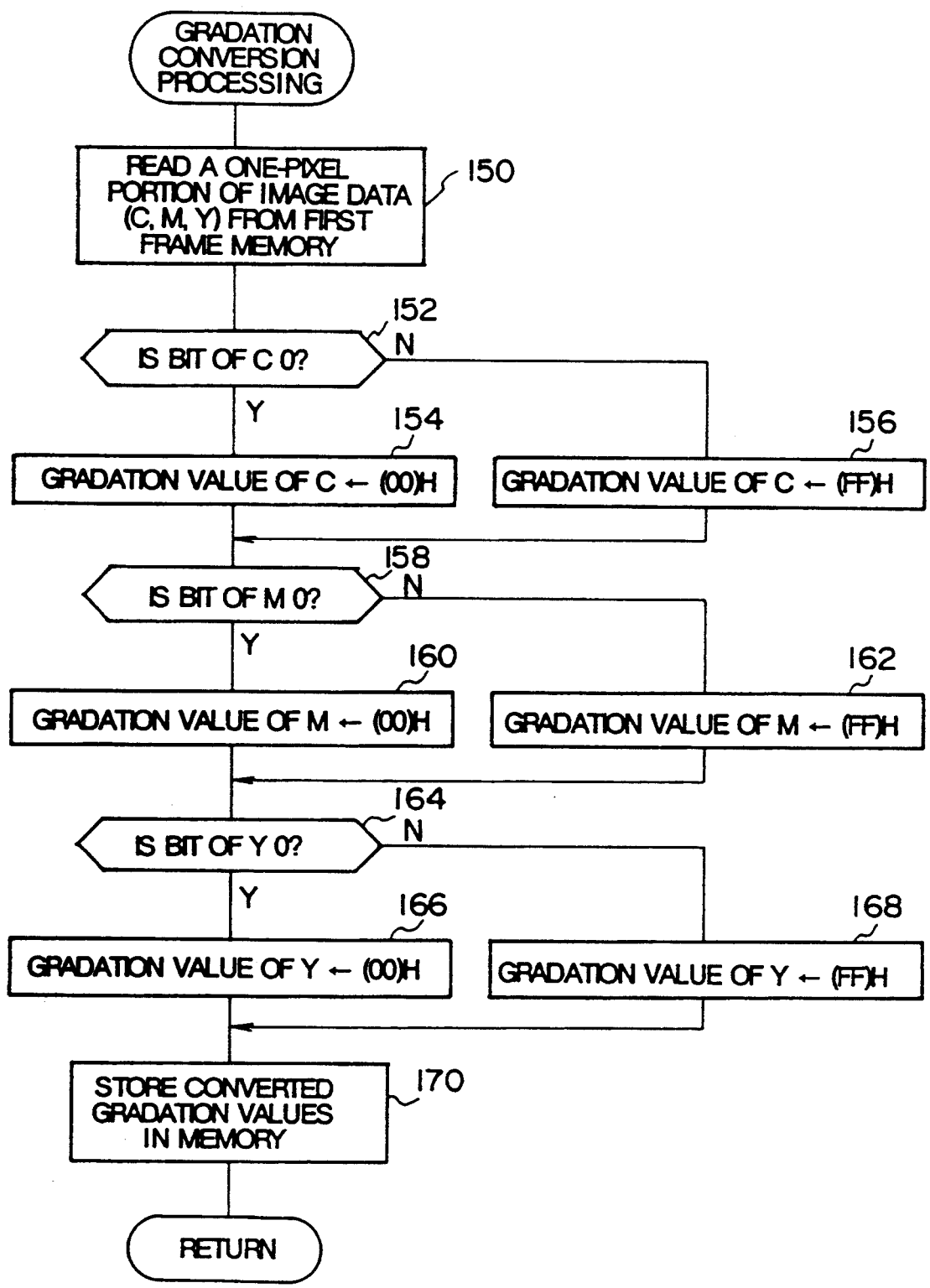
FIG. 6 is a flowchart illustrating a routine for gradation conversion processing.

In Step 124, gradation conversion processing is executed, i.e., processing for converting image data stored in the first frame memory 76 and having a high resolution and a small number of gradations, to image data having a high resolution and a large number of gradations. A description will be given of this processing with reference to a flowchart shown in FIG. 6. In Step 150, image data of a one-pixel portion (3 bits) is read from the first frame memory 76. As for this 3-bit image data, each bit represents the gradation value of C, M, or Y, respectively. In Step 152, a determination is made as to whether or not the bit corresponding to C is a 0. If the bit corresponding to C is a 0, in Step 154, 00H is set as the gradation value of C for the pixel whose image data has been read. It should be noted that H denotes hexadecimal notation, and 00H denotes that all the eight bits are 0s. Meanwhile, if the bit corresponding to C is a 1, FFH is set as the gradation value of C for the pixel in Step 176. It should be noted that FFH denotes that all the eight bits are 1s.

In an ensuing Step 178, a determination is made as to whether or not the bit corresponding to M is a 0. If the bit corresponding to M is a 0, in Step 160, 00H is set as the gradation value of M for the pixel whose image data has been read. Meanwhile, if the bit corresponding to M is a 1, in Step 162, FFH is set as the gradation value of M for that pixel. In the same manner thereafter, in Step 164, a determination is made as to whether or not the bit corresponding to Y is a 0, and if the bit is a 0, in Step 166, 00H is set as the gradation value of Y for that pixel, while if the bit is a 1, in Step 155, FFH is set as the gradation value of Y for that pixel. Through the abovedescribed processing, the respective gradation values of C, M, and Y are respectively represented by 8 bits for each pixel, and data of 24 bits per pixel is thus generated. As a result, one pixel of image data having a resolution of 400 dpi and 8 colors in terms of the number of gradations is converted to one pixel of image data having a resolution of 400 dpi and 16,770,000 colors in terms of the number of gradations. In an ensuing Step 170, the 24-bit data is stored in the memory 74, and the gradation conversion processing ends.

Upon completion of the gradation conversion processing, the operation proceeds to Step 126 in the flowchart shown in FIG. 5 to determine whether or not data of a fixed amount (a one-page portion) has been stored in the memory 74 through the gradation conversion processing. If NO is the answer in the determination in Step 126, the operation returns to Step 124, and the above-described gradation conversion processing is repeated until YES is given as the answer in the determination in Step 126. If YES is given as the answer in the determination in Step 126, in Step 128, the image data stored in the memory 74 and having a resolution of 400 dpi and 16,770,000 colors in terms of the number of gradations, is transferred to the slave processor 82 in the order of the pixels which are to be exposed on the heat-developable photosensitive material 16 by the exposure head 22.

In the slave processor 82, the exposure drum 20 is rotated at high speed in the direction of arrow A in FIG. 1, and the transferred image data is supplied sequentially to the exposure head 22. As a result, the LEDs of the exposure head 22 corresponding to C, M, and Y are caused to emit light in correspondence with the gradation values of C, M, and Y for each pixel of the supplied image data, thereby allowing each pixel of the image corresponding to the image data to be exposed on the heat-developable photosensitive material 16.

In the meantime, in Step 130, a determination is made on the master processor 70 side as to whether or not the transfer of image data has been completed. If NO is the answer in the determination in Step 130, the operation returns to Step 124 to effect gradation conversion processing for each pixel in correspondence with the image data stored in the first frame memory 76, as described above, and processing for transferring the image data to the slave processor 82 after storage of a fixed amount of image data is repeated. It should be noted that if YES is given as the answer in the determination in Step 130, processing ends.

Upon completion of the exposure of the image, the slave processor 82 causes the exposure drum 20 to rotate reversely. As the exposure drum 20 rotates reversely, the heat-developable photosensitive material 16 is peeled off the exposure drum 20 by the scraper 24, water is applied thereto in the water-applying station 26, and the heat-developable photosensitive material 16 is transported to the heat development/transfer station 28. Meanwhile, pieces of the image-receiving material 32 in the tray 30 are taken out consecutively one piece at a time, and each piece of the image-receiving material 32 thus taken out is superposed on and brought into close contact with the heat-developable photosensitive material 16 by the superposition rollers 60 and 62 disposed in the vicinity of the heating drum 34. The superposed heat-developable photosensitive material 16 and image-receiving material 32 are fed into a nip between the heating drum 34 and the endless pressure-contact belt 36 and are transported in a nipped state. The heating drum 34 is heated by the halogen lamp 38, so that the heat-developable photosensitive material 16 undergoes heat development and the exposed image is rendered visible, and this image is transferred to the image-receiving material 32. The heat-developable photosensitive material 16 and the image-receiving material 32 which have passed the heat development/transfer station 28 are separated in the releasing station 48 and are transported, and the heat-developable photosensitive material 16 is sent to the waste-photosensitive-material accommodating box 59, while the image-receiving material 32 is sent up to the takeout tray 54 via the drier 52. As a result, the image-receiving material 32, on which an image corresponding to the transferred image data is recorded, can be obtained.

In the flowchart shown in FIG. 5, if NO is the answer in the determination in Step 122, in Step 132 and thereafter, the image is recorded by using the data stored in the second frame memory 78. For instance, with respect to an image whose one page is composed of an image having a multiplicity of gradations inputted through a color scanner, NO is given as the answer in the aforementioned determination.

Figure 7:
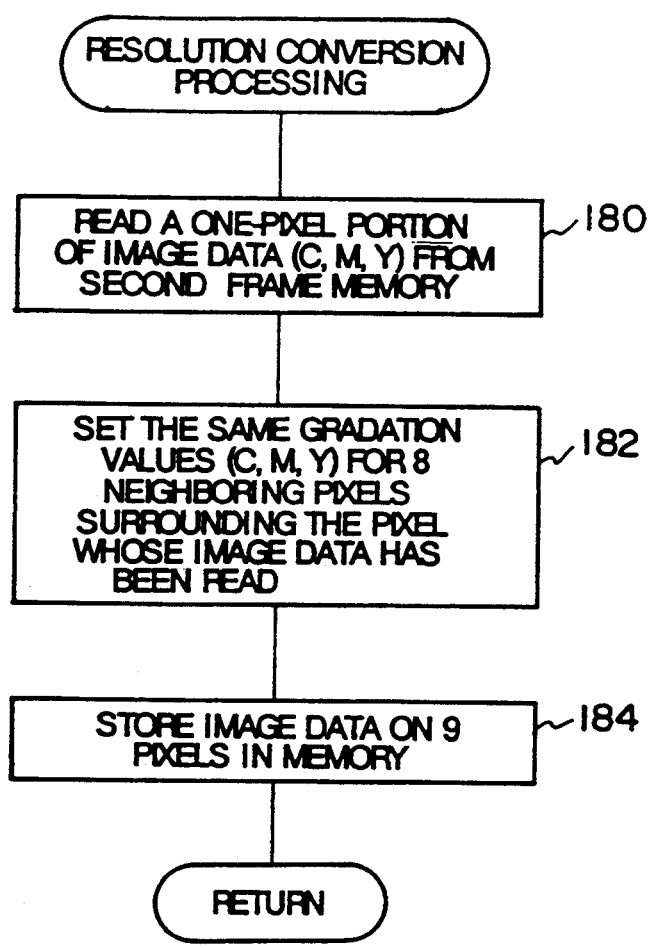
FIG. 7 is a flowchart illustrating a routine for resolution conversion processing.
Figure 9A:
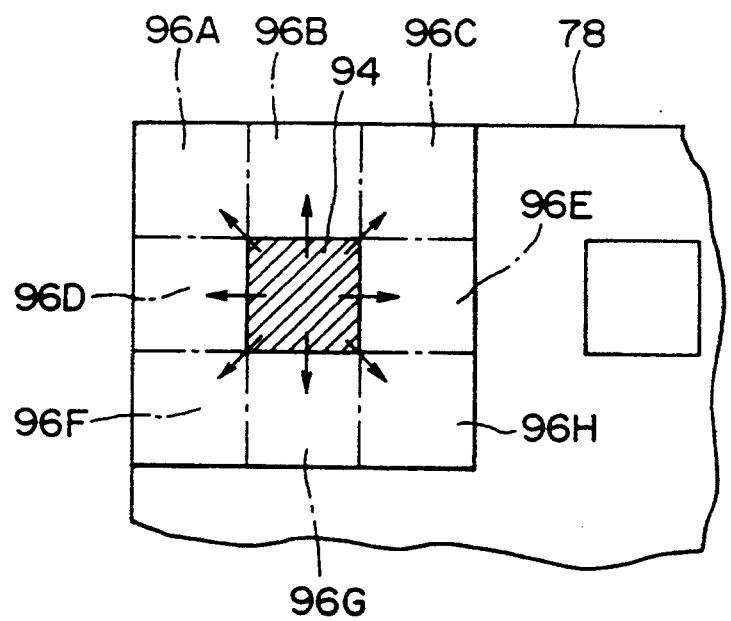
FIGS. 9A and 9B are conceptual diagrams of pixels explaining conversion processing.

In Step 132, resolution conversion processing is executed, i.e., processing for converting image data stored in the second frame memory 78 and having a low resolution and a large number of gradations, to image data having a high resolution and a large number of gradations. A description will be given hereafter of this processing with reference to a flowchart shown in FIG. 7. In Step 180, image data of a one-pixel portion (24 bits) is read from the second frame memory 78. As for this 24-bit image data, each 8 bits represents the gradation value of C, M, or Y, respectively. In Step 182, the same values as the gradation values of C, M, and Y, whose image data has been read, are set as the gradation values of C, M, and Y for eight neighboring pixels surrounding that pixel in a case where the image data stored in the second frame memory 78 is converted to image data having a resolution of 400 dpi. That is, as shown in FIGS. 3A and 3B, the number of pixels per unit area of image data stored in the second frame memory 78 is 1, whereas the number of pixels per unit area of image data stored in the first frame memory 76 is 9. For this reason, in a case where the image data stored in the second frame memory 78 is converted to image data having a resolution of 400 dpi, the number of pixels per unit area becomes 9. For instance, as shown in FIG. 9A, pixels 96A, 96B, 96C, 96D, 96E, 96F, 96G, and 96H appear in the vicinity of a pixel 94 in a unit area including the pixel 94. In this Step 182, the same image data (gradation values for C, M, and Y, respectively) as those of the pixel 94 are set for the virtual pixels 96A, 96B, 96C, 96D, 96E, 96F, 96G, and 96H. As a result, the one-pixel portion of the image data stored in the second frame memory 78 and having a resolution of 133 dpi and 16,770,000 colors in terms of the number of gradations, is converted to a nine-pixel portion of image data having a resolution of 400 dip and 16,770,000 colors in terms of the number of gradations. In Step 184, the image data on the nine pixels is stored in the memory 74, and the resolution conversion processing ends.

Upon completion of the resolution conversion processing, the operation proceeds to Step 134 in the flowchart shown in FIG. 5, and processing is effected in a manner similar to the case where the image is recorded by using the image data stored in the first frame memory 76. That is, in Step 134, a determination is made as to whether or not a fixed amount of data has been accumulated in the memory 74, and the resolution conversion processing in Step 132 is repeated until YES is given as the answer in the determination in Step 134. If YES is given as the answer in the determination in Step 134, in Step 136, the image data stored in the memory 74 and having a resolution of 400 dpi and 16,770,000 colors in terms of the number of gradations, is transferred to the slave processor 82 in the order of the pixels which are to be exposed on the heat-developable photosensitive material 16 by the exposure head 22.

In Step 138, a determination is made as to whether or not the transfer of the image data has been completed, and Steps 132 to 138 are repeated until YES is given as the answer in the determination in Step 138. If YES is given as the answer in the determination in Step 138, processing ends. On the slave processor 82 side, in the same way as described above, the transferred image data is supplied to the exposure head 22, the heat-developable photosensitive material 16 is exposed imagewise and subjected to heat development, and the image is transferred to the image-receiving material 32. As a result, an image corresponding to the image data stored in the second frame memory 78 is recorded on the image-receiving material 32.

In the flowchart shown in FIG. 5, if YES is given as the answer in the determination in Step 120, in Step 140 and thereafter, the image is recorded by using the image data stored in the first frame memory 76 and the image data stored in the second frame memory 78. For instance, YES is given as the answer in the aforementioned determination in the case of an image whose one page includes both a character and a photograph or in cases where a half tone has been designated as the gradation of an area enclosed by a graphic figure.

Figure 8:
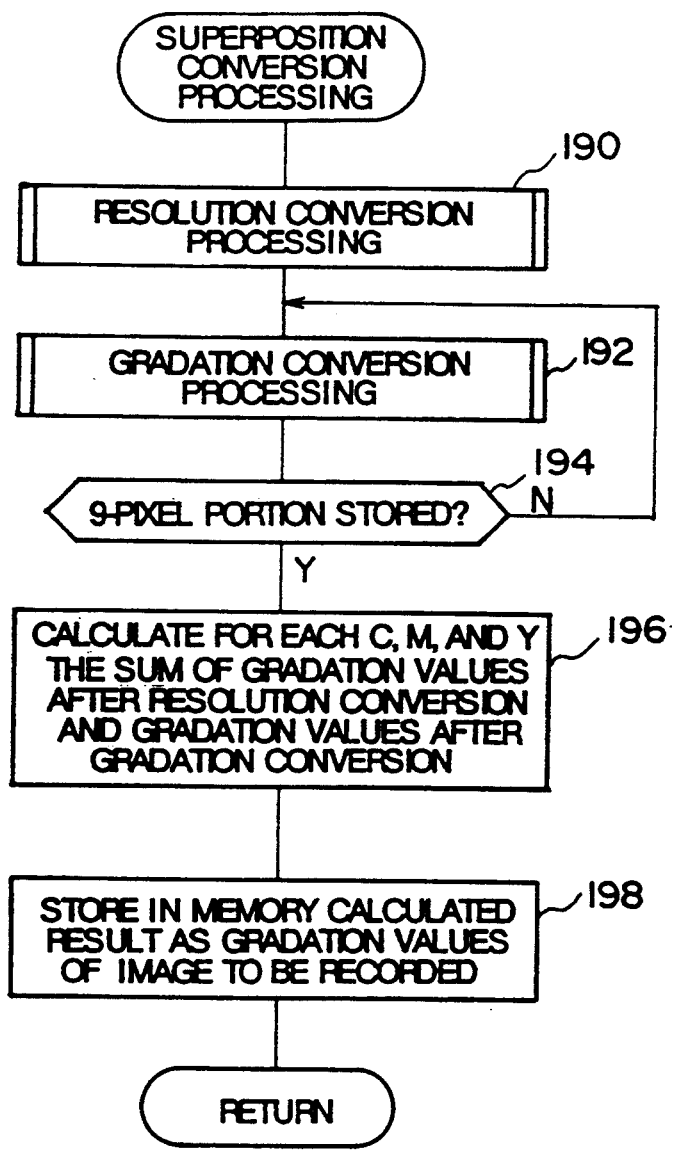
FIG. 8 is a flowchart illustrating a routine for superposition conversion processing.

In Step 140, superposition conversion processing is executed, i.e., processing for converting the image data stored in the first frame memory 76 and the image data stored in the second frame memory 78 to image data having a high resolution and a large number of gradations and for superposing the two items of image data one above the other. A description will be given hereafter of this processing with reference to a flowchart shown in FIG. 8. In Step 190, the above-described resolution conversion processing is executed. As a result, a one-pixel portion of image data stored in the second frame memory 78 and having a low resolution and a large number of gradations, is converted to a nine-pixel portion of image data having a high resolution and a large number of gradations, and is then stored in the memory 74.

Figure 9B:
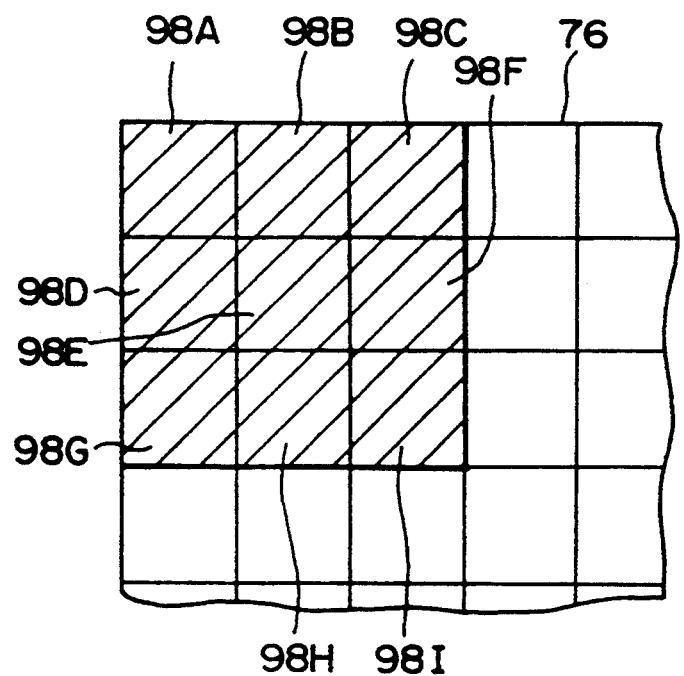

In Step 192, the above-described gradation conversion processing is executed. As a result, the one-pixel portion of image data stored in the first frame memory 76 and having a high resolution and a small number of gradations is converted to a one-pixel portion of image data having a high resolution and a large number of gradations, and is stored in the memory 74. In Step 194, a determination is made as to whether or not the nine-pixel portion of image data has been stored through the processing in Step 192. As for the processing in Step 194, processing is effected with respect to image data on the nine pixels stored in the first frame memory 76 and corresponding to the nine pixels obtained through the processing in Step 190. For instance, in a case where the image data on the nine pixels obtained through the processing in Step 190 is the image data on the pixels 94, 96A, 96B, 96C, 96D, 96E, 96F, 96G, and 96H shown in FIG. 9A, gradation conversion processing is effected with respect to pixels corresponding to the aforementioned nine pixels stored in the first frame memory 76, i.e., with respect to pixels 98A, 98B, 98C, 98D, 98E, 98F, 98G, 98H, and 98I shown in FIG. 9B.

In Step 196, with respect to the image data on the nine pixels obtained through the resolution conversion processing and the image data on the nine pixels obtained through the gradation conversion processing, a calculation is conducted of the sum of the gradation values of C, M, and Y for each corresponding pixel (for each 8 bits). For instance, with respect to the image data on the pixel 96A and the image data on the pixel 98A in FIG. 9, a calculation is conducted of the sum of the respective gradation values of C, M, and Y (for each 8 bits), and a calculation is similarly conducted with respect to other pixels as well. It should be noted that in a case where an overflowing of a digit occurs in the calculation of each gradation value, FFH is preferably set as the gradation value. As a result, it is possible to obtain the nine-pixel portion of image data on the image in which the image data stored in the first frame memory 76 and the image data stored in the second frame memory 78 are superposed one above the other. In an ensuing Step 198, the image data on the nine pixels is stored in the memory 74, and the above-described superposition conversion processing ends.

Upon completion of the superposition conversion processing, the operation proceeds to Step 142 in the flowchart shown in FIG. 5, and a determination is made as to whether or not a fixed amount of data has been stored in the memory 74. The superposition conversion processing in Step 140 is repeated until YES is given as the answer in Step 142. If YES is given as the answer in Step 142, the image data having a resolution 400 dpi and 16,770,000 colors in terms of the number of gradations is transferred to the slave processor 82 in the order of the pixels which are to be exposed on the heat-developable photosensitive material 16 by the exposure head 22. In Step 146, a determination is made as to whether or not the transfer of the image data has been completed, and Steps 140 to 146 are repeated until YES is given as the answer in the determination in Step 146. If it is determined in Step 146 that the transfer of image data has been completed, processing ends. On the slave processor 82 side, in the same way as described above, the transferred image data is supplied to the exposure head 22, the heat-developable photosensitive material 16 is exposed imagewise and subjected to heat development, and the image is transferred to the image-receiving material 32. As a result, an image corresponding to image data in which the image data stored in the first frame memory 76 and the image data stored in the second frame memory 78 are superposed one on top of the other is recorded on the image-receiving material 32.

Thus, in accordance with this embodiment, since the frame memories of the image recording apparatus 10 are comprised of the first frame memory 76 for storing image data having a resolution of 400 dpi and 8 colors in terms of the number of gradations and the second frame memory 78 having a resolution of 133 dpi and 16,770,000 colors in terms of the number of gradations, the storage capacity of the frame memory can be reduced, and the cost can be lowered.

In addition, the arrangement provided is as follows: A determination is made as to whether or not the image represented by the transferred image data can be expressed as an image having a small number of gradations per pixel, and if it is determined that that image can be so expressed, the image data is stored in the first frame memory 76, while if it is determined that that image cannot be so expressed, the image data is stored in the second frame memory 78, and the image data stored in the first and second frame memories 76 and 78 are converted to image data having a large number of pixels per unit area and a small number of gradations per pixel, so as to record the image. Accordingly, an image composed of a character, a graphic figure, or the like is recorded with a high resolution, and an image inputted through a color scanner or the like is recorded with a large number of gradations. Hence, it is possible to record an image with high image quality without deterioration in the image quality required of the image to be recorded.

It should be noted that, although in Step 100 in the flowchart shown in FIG. 4 a determination is made by the image recording apparatus 10 as to whether or not the image represented by the transferred image data can be expressed as an image having a small number of gradations per pixel, an arrangement may be alternatively provided such that a host computer is made to effect the aforementioned determination and to constitute a part of the determining means. In this case, if YES is given as the answer in the aforementioned determination, the host computer transfers image data after converting the data format of the image data to the data format of the first frame memory 76, while if NO is the answer in the aforementioned determination, the host computer transfers the image data after converting the data format of the image data to the data format of the second frame memory 78. On the image recording apparatus 10 side, in Step 100, a determination is made as to whether or not the data format of the transferred image data is the data format of the first frame memory 76, and if YES is the answer in this determination, the image data is stored in the first frame memory 76 in Step 102 without converting the data format, while if NO is the answer in that determination, the image data is stored in the second frame memory 78 in Step 10 4 without converting the data format. In this case, since the amount of data transferred from the host computer to the image recording apparatus 10 is reduced, it is possible to obviate a situation in which a major portion of the storage area of the storage device is occupied by the image data in the host computer, or a high load is applied to the host computer to transfer the image data.

In addition, the arrangement provided in this embodiment is such that a determination is made as to whether or not the image represented by the image data can be expressed by an image having a small number of gradations per pixel, and the image data is then stored in the first frame memory 76 or the second frame memory 78. In this case, NO is given as the answer in that determination with respect to image data representing an image which is preferably recorded with a high resolution and a large number of gradations, and that image data is stored in the second frame memory 78. Accordingly, priority is placed on the gradations in the case of the image to be recorded on the basis of such image data, and the resolution is undermined. To cope with this problem, a determination is made, as shown in Step 200 in the flowchart in FIG. 10, as to whether or not the image represented by the image data can be expressed with a low resolution, and the image data is stored in the first frame memory 76 or the second frame memory 78. In this case, NO is given as the answer in that determination with respect to image data representing an image which is preferably recorded with a high resolution and a large number of gradations, and such image data is stored in the first frame memory 76 in Step 204. Accordingly, priority is placed on the resolution in the case of the image to be recorded on the basis of such image data.

It should be noted that, although the image recording apparatus 10 in accordance with this embodiment is adapted to record images by using the image data transferred from the host computer, the present invention may be applied to an image recording apparatus which is equipped with a color scanner, for example, and is adapted to record images by using data inputted through the color scanner.

In addition, although in this embodiment an example has been shown in which the present invention is applied to an image recording apparatus for recording color images, the present invention may be applied to an image recording apparatus for recording monochromatic images having a large number of gradations so as to reduce the frame memory capacity.

What is claimed is:

1. An image recording method comprising the steps of:
    (a) when an image represented by image data is expressible as an image having a small number of gradations per pixel, storing first image data in first storage means for storing image data having a large number of pixels per unit area and a small number of gradations per pixel, and when the image represented by image data is not expressible as an image having a small number of gradations per pixel, storing second image data in second storage means for storing image data having a small number of pixels per unit area and a large number of gradations per pixel;
    (b) converting the first image data stored in said first storage means to first converted image data having a large number of gradations per pixel, and converting the second image data stored in said second storage means to second converted image data having a large number of pixels per unit area; and
    (c) recording a final image in accordance with the first converted image data and the second converted image data.

2. An image recording method according to claim 1, further comprising the step of:
    determining whether or not the image represented by the image data can be expressed as the image having a small number of gradations per pixel,
    wherein in the step (a) the first image data and the second image data are stored in accordance with a result of the determination in the determining step.

3. An image recording method according to claim 1, wherein in the step (a) the first image data and the second image data is stored after converting a data format of the first image data and the second image data to respective data formats of said first storage means and said second storage means.

4. An image recording method according to claim 1, wherein in the step (c) recording is effected by synthesizing the first image data stored in said first storage means and converted in the step (b) and the second image data stored in said second storage means and converted in the step (b).

5. An image recording method according to claim 4, wherein when a portion where images overlap is present at a time of recording by synthesizing the first image data and the second image data, the storage of the first image data and the second image data is effected after erasing unnecessary image data on the portion where images overlap.

6. An image recording method comprising the steps of:
    (a) when an image represented by image data is expressible as an image having a small number of pixels per unit area, storing second image data in second storage means for storing image data having a small number of pixels per unit area and a large number of gradations per pixel, and when the image represented by image data is not expressible as an image having a small number of pixels per unit area, storing first image data in first storage means for storing image data having a large number of pixels per unit area and a small number of gradations per pixel;
    (b) converting the first image data stored in said first storage means to converted image data having a large number of gradations per pixel, and converting the second image data stored in said second storage means to converted image data having a large number of pixels per unit area; and
    (c) recording a final image in accordance with the first converted image data and the second converted image data.

7. An image recording method according to claim 6, further comprising the step of:
    determining whether or not the image represented by the image data can be expressed as the image having a small number of gradations per pixel,
    wherein in the step (a) the first image data and the second image data are stored in accordance with a result of the determination in the determining step.

8. An image recording method according to claim 6, wherein in the step (a) the first image data and the second image data is stored after converting a data format of the first image data and the second image data to respective data formats of said first storage means and said second storage means.

9. An image recording method according to claim 6, wherein in the step (c) recording is effected by synthesizing the first image data stored in said first storage means and converted in the step (b) and the second image data stored in said second storage means and converted in the step (b).

10. An image recording method according to claim 9, wherein when a portion where images overlap is present at a time of recording by synthesizing the first image data and the second image data, the storage of the first image data and the second image data is effected after erasing unnecessary image data on the portion where images overlap.

11. An image recording apparatus comprising:
    recording means for recording an image in accordance with image data having a large number of pixels per unit area and a large number of gradations per pixel;
    first storage means for storing first image data having a large number of pixels per unit area and a small number of gradations per pixel;
    second storage means for storing second image data having a small number of pixels per unit area and a large number of gradations per pixel;
    determining means for determining whether or not an image represented by the image data can be expressed as an image having a small number of gradations per pixel, whereby when it is determined that the image represented by the image data can be so expressed, the image data is stored in said first storage means, while when it is determined that the image represented by the image data cannot be so expressed, the image data is stored in said second storage means; and a first converting means for converting the first image data stored in said first storage means to converted image data having a large number of gradations per pixel, and a second converting means for converting the second image data stored in said second storage means to converted image data having a large number of pixels per unit area, so as to supply the first converted image data and the second converted image data to said recording means.

12. An image recording apparatus according to claim 11, wherein said determining means stores the first image data and the second image data after converting a data format of the first image data and the second image data to respective data formats of said first storage means and said second storage means.

13. An image recording apparatus according to claim 11, wherein, after converting the first image data and the second image data, said first converting means and the second converted images and said second converting means supply the first converted image data to said recording means in such a manner that recording is effected by synthesizing the first image data stored in said first storage means and the second image data stored in said second storage means.

14. An image recording apparatus according to claim 13, wherein when a portion where images overlap is present at a time of recording by synthesizing the first image data and the second image data, said determining means causes storage of the first image data and the second image data to be effected after erasing unnecessary image data on the portion where images overlap.

15. An image recording apparatus comprising:

recording means for recording an image in accordance with image data having a large number of pixels per unit area and a large number of gradations per pixel;

first storage means for storing first image data having a large number of pixels per unit area and a small number of gradations per pixel;

second storage means for storing second image data having a small number of pixels per unit area and a large number of gradations per pixel;

determining means for determining whether or not an image represented by the image data can be expressed as an image having a small number of pixels per unit area, whereby when it is determined that the image represented by the image data can be so expressed, the image data is stored in said second storage means, while when it is determined that the image represented by the image data cannot be so expressed, the image data is stored in said first storage means; and a first converting means for converting the first image data stored in said first storage means to first converted image data having a large number of gradations per pixel, and a second converting means for converting the second image data stored in said second storage means to second converted image data having a large number of pixels per unit area, so as to supply the first converted image data and the second converted image data to said recording means.

16. An image recording apparatus according to claim 15, wherein said determining means stores the first image data and the second image data after converting a data format of the first image data and the second image data to respective data formats of said first storage means and said second storage means.

17. An image recording apparatus according to claim 15, wherein, after converting the first image data and the second image data, said first converting means said and second converting means supply the first converted image data and the second converted images to said recording means in such a manner that recording is effected by synthesizing the first image data stored in said first storage means and the second image data stored in said second storage means.

18. An image recording apparatus according to claim 17, wherein when a portion where images overlap is present at a time of recording by synthesizing the first image data and the second image data, said determining means causes storage of the first data and the image second image data to be effected after erasing unnecessary image data on the portion where images overlap.

* * * * *